United States Patent [19]

Niederer, Sr.

[11] 4,016,722

[45] Apr. 12, 1977

[54] SAFETY BLOW-OUT PROTECTION FOR FLUID ACTUATORS

[75] Inventor: Otto C. Niederer, Sr., Madison, Ohio

[73] Assignee: Gould Inc., Chicago, Ill.

[22] Filed: May 2, 1975

[21] Appl. No.: 573,984

[52] U.S. Cl. .................................... 60/531; 60/527; 60/530

[51] Int. Cl.[2] ........................................... F03G 7/06

[58] Field of Search ...................... 60/516, 527–531; 337/114, 306, 416; 73/368.3; 92/98 D; 91/400, 401

[56] References Cited

UNITED STATES PATENTS

| | | | |
|---|---|---|---|
| 3,180,235 | 4/1965 | Schmitz | 92/98 D X |
| 3,183,672 | 5/1965 | Morgan | 60/516 X |
| 3,609,635 | 9/1971 | Harris | 60/531 |
| 3,664,698 | 5/1972 | Stropkay | 60/531 X |
| 3,712,052 | 1/1973 | Staschke | 60/527 |

*Primary Examiner*—Allen M. Ostrager

*Attorney, Agent, or Firm*—Donnelly, Maky, Renner & Otto

[57] ABSTRACT

Excessive pressure is relieved in a fluid actuator by controlled destruction of an internal extensible diaphragm without damage to the exterior structural integrity of the actuator. Upon occurrence of such abnormal excessive pressure in the actuator pressure chamber, the diaphragm, which is otherwise substantially supported, is permitted to deform at a known location until fracturing thereof occurs to release fluid from the pressure chamber. In one form the invention comprises an opening in the actuator guide cap and in other forms comprises openings in the actuator piston or an enlargement in part of the guide cap.

19 Claims, 10 Drawing Figures

SAFETY BLOW-OUT PROTECTION FOR FLUID ACTUATORS

BACKGROUND OF THE INVENTION

This invention is directed to a pressure relief arrangement for a fluid actuator, and, more particularly, is directed to such a pressure relief arrangement for a linear fluid actuator that converts a thermal input to a mechanical output.

Electro-thermal actuators and other fluid actuator devices that restrain a fluid pressure by means of a rolling diaphragm are sometimes subject to pressures great enough to cause violent disassociation of the parts constituting the actuator. In a thermal actuator, such a high pressure might occur if the unit were heated well beyond normal operating conditions, for example, by a fire occurring in the building in which the actuator were located. Moreover, in those electro-thermal actuators normally energized for short intervals, a prolonged energization of the same might effect such an undesirable large pressure build up. Thus, abnormal excessive pressure build up may be due to external ambient or overload conditions of the actuator, excesssive energization input, etc.

The present invention which provides relief of excessive pressures in a fluid actuator device without violent disassociation of the parts thereof, will be described in detail herein with reference to an electro-thermal linear fluid actuator device or thermal actuator, as shown, for example, in U.S. Pat. Nos. 3,609,635 and 3,805,528. Such a thermal actuator includes a main body or casing and an extensible member, such as a diaphragm in sealed engagement with the body to define a fluid chamber having a volume that is variable according to the position of the extensible member with respect to the body. By heating a thermally expansive working medium in the chamber, the pressure therein is increased and tends to urge the extensible member away from the body expanding the chamber and performing mechanical work. It is to be understood, however, that the principles of the invention may be applied to other types of fluid actuator devices, especially linear fluid actuator devices, such as those that operate in response to a pneumatic or hydraulic fluid input to the chamber.

SUMMARY OF THE INVENTION

The present invention is directed to an arrangement for facilitating perforation of the extensible member in a fluid actuator device for controlled relief of excessive pressure in such device. The extensible member may be, for example, a diaphragm having a cap portion that projects into the fluid chamber defined in the main body of the actuator and an annular fold along which the diaphragm may roll with minimum resistance for enlargement and reduction of the chamber volume, and the invention provides for controlled rupturing or fracturing of the diaphragm to release excessive pressure in the fluid chamber. Of course, other types of extensible member may be used. In one embodiment the invention takes the form of a hole in the normally supportive guide casing of the actuator device, and in another embodiment the invention includes an embossment on the guide casing. In still other embodiments the invention takes the form of a slot or opening in a piston member that usually abuts the extensible member on its side opposite the fluid chamber.

The primary object of the present invention is to provide a means for causing a controlled relief of excessive pressure in a fluid actuator by effecting a rupturing or fracturing of the diaphragm or other extensible member thereof before the pressure in the actuator fluid chamber reaches a dangerous level. Therefore, as pressure increases in the fluid chamber, the diaphragm, which is substantially supported, will tend to stretch at an unsupported part, for example, through a hole provided in the guide casing. As the pressure continues to increase the diaphragm portion protruding through the hole will rupture to release the pressure at a pressure level well below that at which violent disassociation of the actuator assembly might occur, yet at a pressure level well above those pressures normally obtained during normal operation of the actuator.

With the foregoing in mind, it is a principal object of the present invention to provide a fluid actuator device improved in the noted respects.

Another object of the invention is to relieve excessive pressure in the fluid chamber of a fluid actuator device.

An additional object of the invention is to provide controlled relief of excessive pressure in a fluid actuator device.

A further object of the invention is to provide controlled perforation or rupturing of an extensible member in a fluid actuator device.

Still another object of the invention is to provide controlled relief of excessive pressure in a fluid actuator device without disassociation of the parts thereof.

Still an additional object of the invention is to provide a safety blow-out arrangement for controlled relief of excessive pressures in a fluid actuator device, thus increasing the safe operation of such device.

These and other objects and advantages of the present invention will become apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENTS

Figure 1:
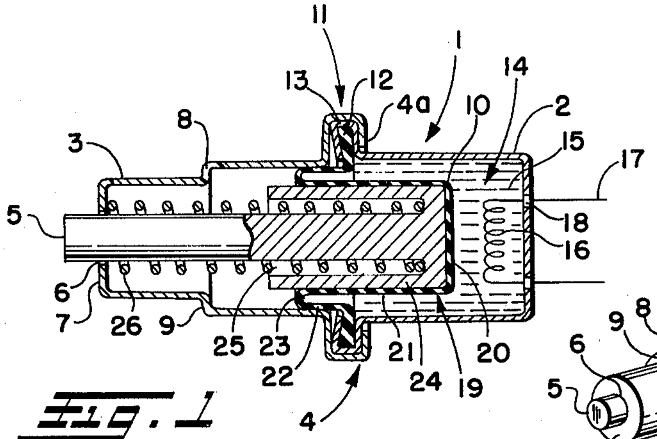
FIG. 1 is a section view of a de-energized thermal actuator having a pressure relief hole in the guide casing.
Figure 1A:
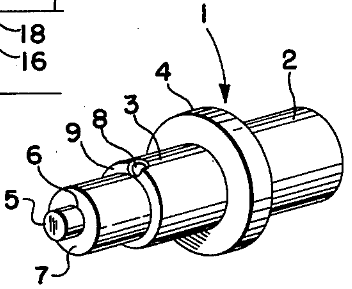
FIG. 1A is an external isometric view of the thermal actuator of FIG. 1.
Figure 2:
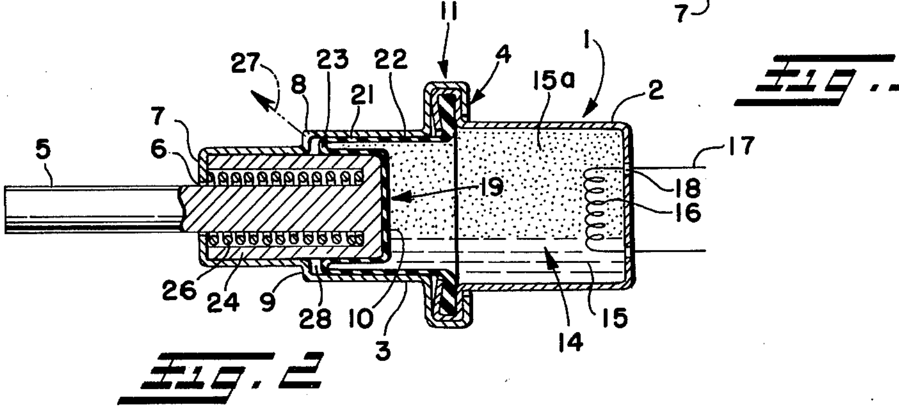
FIG. 2 is a section view of the thermal actuator of FIG. 1 now in the energized condition.

Referring now more particularly to the drawings, wherein like reference numerals designate like parts in the several figures, and initially to FIGS. 1, 1A and 2, a thermal actuator is generally indicated at 1. As it appears externally in FIG. 1A, the thermal actuator 1 includes a main body or casing 2, to which a stepped guide cap or casing 3 is secured at a flange connection 4. A piston rod or actuator rod 5 protrudes partially through an opening 6 in the front end wall 7 of the guide cap 3, when the thermal actuator is de-energized, and fully from that opening when the thermal actuator is energized in the manner shown, for example, in FIG. 2. A safety blow-out or pressure relief opening 8 is formed in the guide cap 3, preferably proximate or at the annular step 9 thereof. During normal operation of the thermal actuator 1, the pressure relief opening 8 will have little or no effect; however, during abnormal external and/or operating conditions of the thermal actuator 1, which conditions would cause fluid pressure therein to exceed the normally expected pressures, such excessive fluid pressure will be relieved through the pressure relief opening 8 well before the fluid pressure would reach a dangerous level.

As shown in greater detail in FIGS. 1 and 2, an extensible diaphragm member 10 is secured within and to the main body 2 at a fluid tight seal 11 defined by an annular rim 12 of the diaphragm which is captured by a crimped flange 13 of the body. A variable volume fluid pressure chamber 14 is thus formed by the body 2 and diaphragm 10, and a quantity of thermally expansible and contractible material 15 is contained therein. An electric heater 16 in the fluid chamber 14 may be fed with electric power from an external supply, not shown, via electrical leads 17 that pass through electrically non-conductive seals 18 in the main body 2; the heat generated by the heater 16 expands the material 15 increasing fluid pressure in the pressure chamber 14 and the force on the diaphragm 10 tending to cause expansion of the chamber.

The extensible diaphragm member 10 is preferably in the form of a cylindrical-shape diaphragm which is inverted or reverse-folded to form a cap 19 defined by a relatively flat circular end 20 and a cylindrical leg 21, and the cap portion joins a further cylindrical leg portion 22 at an annular fold 23. The diaphragm rim 12 terminates the further cylindrical leg portion 22 and the cap portion 19 forms a variable projection into the chamber 14, the projection length increasing and decreasing with respective increases and decreases in the chamber pressure.

The diaphragm material may be of the unreinforced or reinforced type and may be formed of various types of natural and/or synthetic materials, depending on the desired strength, resiliency, fluid permeability, temperature dependency and the like parameters. Moreover, it is, of course, to be understood that other types of extensible members may be used, such as, for example, stretching type diaphragms, bellows type devices, etc., the principal operation criteria for selection of the extensible member being its ability to provide for enlargement and reduction in the size of the fluid chamber 14 as pressure in the latter is varied in order to convert such pressure changes to a mechanical output in terms of force and/or an output stroke over a distance.

The thermally expansible and contractible working fluid 15 is selected to provide preferably a quick response when heated to effect an increase in the pressure within the fluid chamber 14, and it has been found that one satisfactory working fluid is a halogenated hydrocarbon containing a fluorine atom, which fluid is normally sold under the trademark "FREON". Such a working fluid would normally be in a liquid phase at ambient temperatures and will vaporize at about 200° F.; and in the liquid phase such fluids are relatively inertand dielectric. Another type of working fluid suitable for use in the thermal actuator 1 is known as a fluoro-inert liquid and is sold under the trademark "FC" by the 3-M Company; one particular advantage to the FC fluids is their capability of mixture of two or more such fluids to adjust the boiling point thereof, and another advantage is their relatively low permeability through diaphragms made of elastomeric materials relative to the Freon fluids. Other types of working fluids, as well as waxes and metal hydrides, may be used in the thermal actuator 1, depending on the operational criteria of the same, including, for example, energization and recycling, normal ambient temperatures, and the like.

The guide cap 3 is secured to the main body 2 by a folded flange 4a and the internal surface of the guide cap provides an exterior supportive function for the diaphragm cylindrical leg 22, which increases and decreases in length as the diaphragm rolls along its annular fold 23. A piston 24 inserted in the diaphragm cap portion 19 provides a supportive function for the cap portion and transmits the mechanical output of the thermal actuator 1 via the piston rod 5 as the cap portion projection into the chamber 14 is varied. The piston 24 and piston rod 5 may be integral or separate connected pieces and may be formed of metal, plastic, or other relatively strong rigid material. Preferably the opening 6 in the guide cap 3 is relatively smooth to avoid scarring the piston rod as the latter moves in an out. Moreover, the piston 24, which is of generally cylindrical profile with a solid end engaged with the diaphragm cap portion, has an annular slot 25 that receives a portion of a light force return spring 26 that also bears against the front end wall 7 of the guide cap 3 proximate the opening 6. The return spring normally urges the piston 24 and diaphragm 10 to their position shown in FIG. 1 when the actuator 1 is de-energized. Obviously by using a relatively strong or heavy return spring 26, the actuator would be double acting to provide output forces in both directions as the piston rod 5 moves out and in upon energization and de-energization of the actuator.

To operate or to energize the thermal actuator 1, electric power is supplied to the heater 16, which preferably rapidly heats and also rapidly effects vaporization of at least part of the working liquid 15 to increase the total fluid pressure within the fluid chamber 14. The increased fluid pressure then overcomes the force of the return spring 26 and tends to push the projection of the diaphragm cap portion 19 and piston 24 from its in-stroked position shown in FIG. 1 toward its maximum outstroked position with the piston travel being limited by abutment with the front end wall of the guide cap 3, as shown in FIG. 2, while the piston rod 5 then may perform work on an external device, not shown. When the actuator 1 is in its de-energized condition, the fluid chamber 14 is preferably filled with the working liquid 15 for optimum operation regardless of the orientation of the thermal actuator, and thus assuring that the heater 16 will be fully submerged and to an extent cooled by the liquid to prevent burning out. Of course as the piston and diaphragm projection is moved to the out-stroked position, as shown in FIG. 2, a portion of the working liquid will have been vaporized, as is indicated, for example, at 15a. It will also be clear that as the diaphragm 10 rolls along its annular fold 23, the cap portion 19 and the further cylindrical leg portion 22 are substantially fully supported, respectively, by the piston 24 and the guide cap 3, thus increasing the longevity of the diaphragm.

In the event that undesirable excessive pressure builds up in the fluid chamber 14, after the piston 24 and diaphragm cap portion 19 have moved fully to the out-stroked position, the diaphragm may stretch somewhat along its annular fold 23 until the annular fold engages the step 9 in the guide cap 3, the cooperable piston cylindrical body and the reduced diameter of the guide cap preventing further diaphragm extension beyond that point. Thereafter, a continued increase in the fluid pressure will cause a portion of the diaphragm to protrude into and through the pressure relief opening 8; and as the protrusion continues to expand, it will ultimately rupture or blow-out in the direction of the arrow 27 to release fluid from the fluid chamber 14 and thus relieve the pressure therein. The pressure level at which such rupturing occurs may be controlled by varying the dimensions of the pressure relief opening 8 as well as the materials and other designed characteristics of the diaphragm 10. Moreover, the pressure relief operation may occur in a somewhat modified manner, whereby a portion of the diaphragm along its annular fold 23 ruptures before stretching to engagement with the guide cap step, and in such event the excessive fluid pressure would be relieved through the pressure relief opening 8 via the annular space 28 remaining between the diaphragm annular fold 23 and the guide cap step.

A thermal actuator in accordnace with the described invention was successfully built and tested. The main body of such actuator had a cross-sectional diameter of approximately ½ inch, and the extensible diaphragm member therein was an unreinforced diaphragm manufactured by the Geneva Rubber Company. The actuator was energized for normal operation and developed approximately 100 psi pressure in the fluid chamber with a corresponding output force at the piston rod 5 on the order of approximately 15 pounds over a stroke distance of approximately ½ inch. The diameter of the pressure relief opening 8 was on the order of 3/32 of a inch, and in several actuators tested for blow-out operation, for exapmle, by maintaining the heater energized well after the piston reached abutment with the front guide cap wall, blow-out and pressure relief occurred at an average pressure in the fluid chamber 14 on the order of 260 psi. This last pressure is well below that at which the parts of the actuator would become disassociated.

Figure 3:
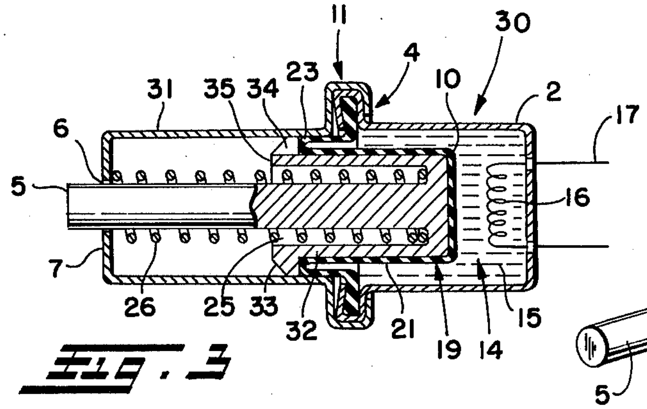
FIG. 3 is a section view of a de-energized thermal actuator including a piston with a slotted supportive skirt.
Figure 3A:
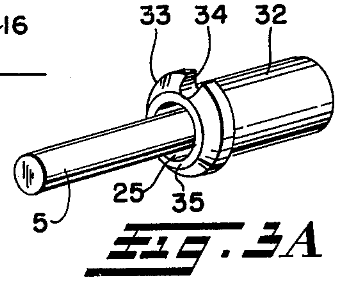
FIG. 3A is an isometric view of the piston used in the thermal actuator of FIG. 3.

Turning now more particularly to FIGS. 3 and 3A, there is illustrated a thermal actuator 30 that is substantially identical to the thermal actuator 1 described above with the exception of the configuration of the guide cap 31 and piston 32. In the actuator 30 the guide cap 31 is substantially completely cylindrical and the size of the opening 6 through which the piston rod 5 extends provides suitable clearance with the latter for blow-out and pressure relief through such clearance. A skirt 33 added to the piston 32 has an outer circumference approximately equal to the inner circumference of the guide cap 31 in order to cooperate with the latter to assure linear motion and guidance of the piston and piston rod during operation of the actuator. A slot 34 in the piston skirt 33 provides for pressure relief in the fluid chamber in a manner to be described below. In nomral operation of the thermal actuator 30 the slot 34 has substantially no affect and the actuator may be energized and de-energized in the above-described manner; however, during such operation the piston skirt cooperates with guide casing 31 and the piston rod 5 cooperates with walls defining the guide cap opening 6 to maintain linear movement of the piston and piston rod and accurate support of the diaphragm cap portion 19.

An excessive pressure build up in the fluid chamber 14 of the thermal actuator 30 will cause the diaphragm 10 to stretch at its annular fold 23 in the manner described above, and ultimately and diaphragm will rupture or blow-out at the annular fold and preferably at the slot 34 to release fluid through the slot 34 and the clearance at the opening 6. The blow-out pressure may be determined, for example, by the dimensions of the slot 34 and/or by the diaphragm composition. Upon blow-out the reduced pressure in the fluid chamber 14 may permit the piston to move slightly inward from the front end wall of the guide cap 3 or the spring 26 may preclude the piston from abutting such end wall in order that the flat annular wall 35 does not seal with the latter and preclude pressure relief. Alternatively, the slot 34 may be cut to the return spring slot 25 to ensure fluid communication with the clearance at the opening 6 or an additional blow-out hole, not shown, may be formed in the front end wall 7 of the guide cap 31.

Figure 4:
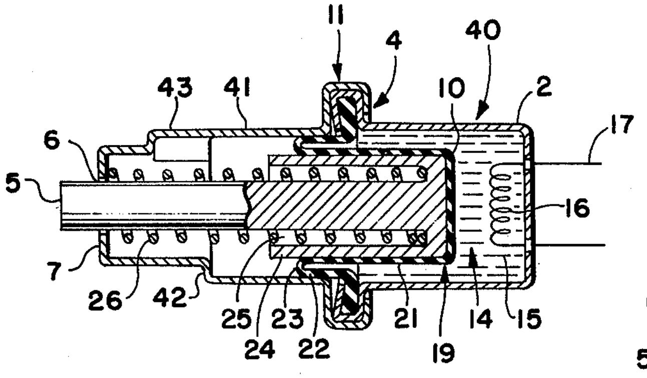
FIG. 4 is a section view of a de-energized thermal actuator having a pressure relief embossment in the guide casing.
Figure 4A:
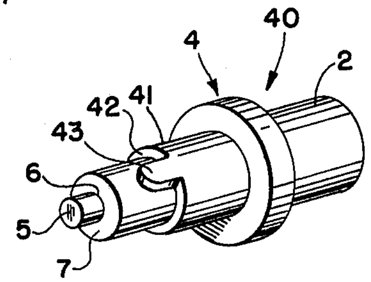
FIG.4A is an external isometric view of the thermal actuator of FIG. 4.

Referring now more particularly to FIGS. 4 and 4A, a thermal actuator 40 is similar to the above-described thermal actuator 1 with the exception of the formation of the guide cap 41, and normal operation of the thermal actuator 40 is similar to that described above with reference to the thermal actuator 1. The guide cap 41 is annularly stepped at 42, and that annular step is interrupted by an embossment 43, the shape of which is most clearly illustrated in FIG. 4A. When the thermal actuator 40 becomes overloaded, the diaphragm 10 may stretch at its annular fold until substantially all of the diaphragm becomes supported at the annular step 42, except for that portion of the diaphragm which is permitted to stretch further into the further void defined by the embossment 43, and it is this latter portion of the diaphragm that will tend to burst to relieve pressure in the fluid chamber 14. The excess fluid may be released either through a clearance provided at the opening 6, as described above with reference to the thermal actuator 30 in FIG. 3, or an additional fluid release opening may be supplied in the embossment 43.

Figure 5:
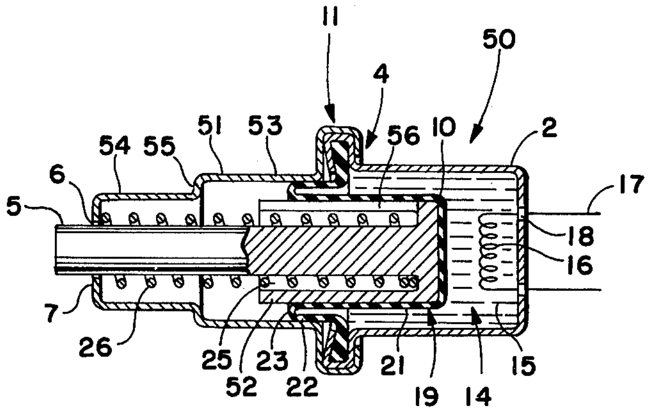
FIG. 5 is a section view of a de-energized thermal actuator including a piston having a longitudinal slot for controlled pressure relief.
Figure 5A:
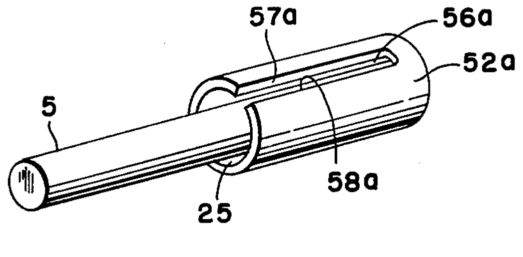
FIGS. 5A and 5B are isometric views of two different types of pistons having longitudinal slots for use in the thermal actuator of FIG. 5.
Figure 5B:
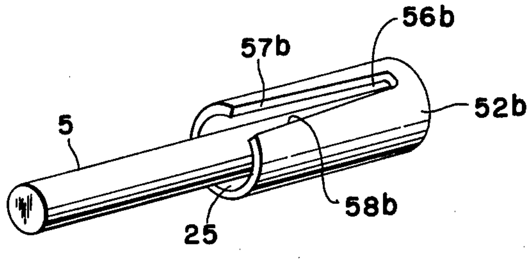

In FIG. 5 the thermal actuator generally indicated at 50 is similar to the above-described thermal actuator 1 with the exception of the formation of the guide cap 51 and the piston 52. The guide cap 51 has two substantially cylindrical portions 53, 54 which are connected at a solid annular step 55. Moreover, the piston 52 has a longitudinal slot 56 formed in its otherwise substantially solid outer periphery. The slot 56 may have parallel or angular sides as can be seen more clearly in FIGS. 5A and 5B, respectively, wherein the parallel sides **57*a*, 58*a* of a slot 56*a* in piston 52*a* are shown in the former and the angular or tapered sides of the slot 56*b* in a piston 52*b* are indicated at 57*b*, 58*b* in the latter. The pistons 52*a*, 52*b*, respectively illustrated in FIGS. 5A and 5B correspond to the piston 52 shown in the thermal actuator 50 of FIG. 5, the only distinction being the particular shape of the respective slots 56*a*, 56*b*, and either piston may be used in the thermal actuator 50, depending on the desired blow-out pressure and/or characteristics of the thermal actuator 50**.

Operation of the thermal actuator 50 under normal conditions is substantially the same as described above with reference to the thermal actuator 1 of FIG. 1. However, in the event of excessive pressure build up in the fluid chamber 14, the portion of the diaphragm leg 21 located above the piston slot 56 will deform into the latter and ultimately will perforate to release fluid to the clearance provided at the opening 6 in the front end wall 7 of the guide cap 53 via the cylindrical return spring slot 25 in the piston 52.

It should now be understood that the present invention provides for a controlled blow-out or pressure relief in a fluid actuator device, regardless of whether such device is energized by application of an external fluid, application of heat or cold, application of electrical power, or the like. By incorporating the present invention in a fluid actuator, the several actuator parts desirably fully maintain their integrity in the course of normal operation; however, in the event of abnormal conditions, regardless of the cause, that effect an undesirable excessive pressure build up in the actuator, controlled pressure relief is provided by self or cooperative destruction of one or more of the actuator parts while preferably maintaining maximum external integrity of the actuator.

The embodiments of the invention in which an exclusive property or privilege is claimed are defined as follows:

1. A fluid actuator device, comprising a body, an extensible means in sealed engagement with said body for forming a variable volume pressure chamber, said extensible means being movable with respect to said body to effect changes in the volume of said pressure chamber and thus to convert normal pressure variations in said pressure chamber to mechanical energy, said extensible means comprising a diaphragm, means for controllably relieving pressure in said pressure chamber when an abnormal pressure level occurs therein in excess of a predetermined level, said means for controllably relieving comprising means for facilitating controlled fracturing of said diaphragm.

2. A fluid actuator device as set forth in claim 1, further comprising a thermally responsive liquid substantially filling said pressure chamber when said fluid actuator device is in de-energized condition, and means for applying heat to said liquid effecting vaporization and expansion of at least a part of the same to cause a corresponding increase in fluid pressure in said pressure chamber.

3. A fluid actuator device as set forth in claim 1, further comprising means for supporting a portion of said diaphragm on its side remote from said pressure chamber.

4. A fluid actuator device as set forth in claim 3, said means for supporting comprising guide cap means for generally confining said diaphragm for linear movement thereof.

5. A fluid actuator device, comprising a body, an extensible means in sealed engagement with said body for forming a variable volume pressure chamber, said extensible means comprising a diaphragm movable with respect to said body to effect changes in the volume of said pressure chamber and thus to convert normal pressure variations in said pressure chamber to mechanical energy, means for supporting a portion of said diaphragm on its side remote from said pressure chamber, said means for supporting comprising guide cap means for limiting extension of said diaphragm, and means for relieving pressure in said pressure chamber when an abnormal pressure level occurs therein in excess of a predetermined level, said means for relieving comprising means for facilitating controlled fracturing of said diaphragm and said means for facilitating comprising an opening in an otherwise diaphragm supportive portion of said guide cap means, said diaphragm being unsupported at said opening.

6. A fluid actuator device as set forth in claim 4, said diaphragm having a cap portion projecting into said pressure chamber and an annular fold along which said diaphragm may roll for varying said projection to effect a corresponding change in the volume of said pressure chamber, said means for supporting further comprising a piston in supportive engagement with said diaphragm cap portion.

7. A fluid actuator device as set forth in claim 6, said diaphragm having an outer generally cylindrical leg substantially completely supported by said guide cap means, said piston substantially completely supporting said diaphragm cap portion, said annular fold normally being unsupported, and said opening being located in said guide cap means to permit part of said diaphragm at said annular fold to extend therethrough upon occurrence of such abnormal pressure in said pressure chamber.

8. A fluid actuator device as set forth in claim 7, said guide cap means having a step portion that limits maximum extension of said diaphragm annular fold, and said opening being located at least partially in said step portion.

9. A fluid actuator device, comprising a body, an extensible means in sealed engagement with said body for forming a variable volume pressure chamber, said extensible means comprising a diaphragm movable with respect to said body to effect changes in the volume of said pressure chamber and thus to convert normal pressure variations in said pressure chamber to mechanical energy, means for supporting a portion of said diaphragm on its side remote from said pressure chamber, said means for supporting comprising guide cap means for generally confining said diaphragm for linear movement thereof, and said means for supporting further comprising a piston in supportive engagement with part of said diaphragm, and means for relieving pressure in said pressure chamber when an abnormal pressure level occurs therein in excess of a predetermined level, said means for relieving comprising means for facilitating controlled fracturing of said diaphragm, and said means for facilitating comprising an opening in an otherwise normally diaphragm supportive portion of said piston, said diaphragm being unsupported at said opening and capable of fracturing and releasing fluid through the same upon occurrence of such abnormal pressure in said pressure chamber.

10. A fluid actuator device as set forth in claim 9, further comprising piston rod means having a portion extending through an opening in said guide cap means for transmitting mechanical movements of said piston to a location externally of said guide cap means, and a clearance between said piston rod means and said guide cap means opening to provide an exit flow path for fluid released by such a fractured diaphragm.

11. A fluid actuator device as set forth in claim 9, said piston including a skirt portion having an exterior profile generally corresponding to the interior profile of said guide cap means, whereby said skirt portion and guide cap means cooperate to provide guidance for said piston for linear movement thereof in said guide cap means, and said opening being located in said piston skirt portion.

12. A fluid actuator device as set forth in claim 11, said diaphragm having a cap portion projecting into said pressure chamber and an annular fold along which said diaphragm may roll for varying said projection to effect a corresponding change in the volume of said pressure chamber, said piston being in supportive engagement with said diaphragm cap portion, and said piston skirt portion being able to provide a supportive function to said diaphragm annular fold.

13. A fluid actuator device as set forth in claim 9, said diaphragm having a cap portion projecting into said pressure chamber and an annular fold along which the diaphragm may roll for varying said projection to effect a corresponding change in the volume of said pressure chamber, said piston being in supportive engagement with said diaphragm cap portion, said diaphragm having an outer substantially cylindrical leg substantially completely supported by said guide cap means, said piston having a flat end and a generally cylindrically-shaped surface substantially completely supporting said diaphragm cap portion, and said opening in said piston comprising a generally longitudinal slot in said piston generally cylindrically-shaped surface.

14. A fluid actuator device as set forth in claim 13, said piston having a cylindrical opening in which a return spring is positioned, said return spring being also in engagement with a portion of said guide cap means to apply a force to said piston normally urging said projection into said pressure chamber when the fluid actuator device is de-energized, said longitudinal slot opening into said cylindrical opening for release of fluid therethrough.

15. A fluid actuator device as set forth in claim 14, wherein the longitudinal sidewalls defining said longitudinal slot are substantially parallel.

16. A fluid actuator device as set forth in claim 14, wherein the longitudinal sidewall defining said longitudinal slot are flared at an acute angle with respect to each other.

17. A fluid actuator device, comprising a body, an extensible means in sealed engagement with said body for forming a variable volume pressure chamber, said extensible means comprising a diaphragm movable with respect to said body to effect changes in the volume of said pressure chamber and thus to convert normal pressure variations in said pressure chamber to mechanical energy, means for supporting a portion of said diaphragm on its side remote from said pressure chamber, said means for supporting comprising guide cap means for limiting extension of said diaphragm and guiding the latter for generally linear movement and a piston in supportive engagement with part of said diaphragm, said piston and guide cap means having cooperable portions substantially to limit the maximum extension of said diaphragm, and means for relieving pressure in said pressure chamber when an abnormal pressure level occurs therein in excess of a predetermined level, said means for relieving comprising means for facilitating controlled fracturing of said diaphragm, and said means for facilitating comprising an enlargement of said cooperable portion of said guide cap means to permit further extension of part of said diaphragm into the same upon occurrence of such abnormal pressure in said pressure chamber.

18. A fluid actuator device as set forth in claim 17, said diaphragm having a cap portion projecting into said pressure chamber and an annular fold along which said diaphragm may roll for varying said projection to effect a corresponding change in the volume of said pressure chamber, said diaphragm having an external cylindrical leg terminating in a fluid seal with said body, said guide cap means including two substantially cylindrical portions connected at a substantially annular step, the first and larger diameter portion of said guide cap means being normally in supportive engagement with said diaphragm cylindrical leg, said piston being normally in supportive engagement with said diaphragm cap portion and being movable into the second and smaller diameter portion of said guide cap means, said piston having a generally cylindrically-shaped surface which together with said step and second guide cap means portion form the mentioned cooperable portions and said enlargement comprising an extension of said first larger diameter portion into the area of the second smaller diameter portion of said guide cap means to permit extension thereinto of a limited part of said diaphragm at its annular fold for fracturing of that diaphragm part upon occurrence of such abnormal pressure in said pressure chamber.

19. A fluid actuator device as set forth in claim 18, further comprising piston rod means having a portion extending through an opening in said guide cap means for transmitting mechanical movements of said piston to a location externally of said guide cap means, and a clearance between said piston rod means and said guide cap means opening to provide an exit flow path for fluid released by such a fractured diaphragm.

* * * * *

UNITED STATES PATENT OFFICE

CERTIFICATE OF CORRECTION

PATENT NO. : 4,016,722

DATED : April 12, 1977

INVENTOR(S) : Otto C. Niederer, Sr.

It is certified that error appears in the above-identified patent and that said Letters Patent are hereby corrected as shown below:

In Claim 6 of the patent, "as set forth in claim 4" should read —as set forth in claim 5—

Signed and Sealed this

Fourteenth Day of June 1977

[SEAL]

*Attest:*

RUTH C. MASON
*Attesting Officer*

C. MARSHALL DANN
*Commissioner of Patents and Trademarks*